United States Patent
Yang et al.

(10) Patent No.: US 8,607,286 B2
(45) Date of Patent: Dec. 10, 2013

(54) METHOD, EQUIPMENT AND SYSTEM FOR REDUCING MEDIA DELAY

(75) Inventors: Peilin Yang, Nanjing (CN); Bing Sun, Nanjing (CN); Yekui Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 13/302,809

(22) Filed: Nov. 22, 2011

(65) Prior Publication Data

US 2012/0072948 A1  Mar. 22, 2012

Related U.S. Application Data (63) Continuation of application No. PCT/CN2010/074110, filed on Jun. 19, 2010.

(30) Foreign Application Priority Data

Jun. 30, 2009  (CN) .......................... 2009 1 0108543

(51) Int. Cl.
*H04N 7/173*  (2011.01)

(52) U.S. Cl.
USPC ............... 725/94; 725/95; 725/117; 725/120; 725/131

(58) Field of Classification Search
USPC ............................... 725/94–95, 117, 120, 131
See application file for complete search history.

(56) References Cited

U.S. PATENT DOCUMENTS

| | | | |
|---|---|---|---|
| 7,830,908 B2 * | 11/2010 | Akgul et al. .................. 370/464 |
| 2005/0081244 A1 | 4/2005 | Barrett et al. | |
| 2006/0222323 A1 | 10/2006 | Sharpe et al. | |
| 2007/0204320 A1 | 8/2007 | Wu et al. | |
| 2008/0022320 A1 * | 1/2008 | Ver Steeg ........................ 725/78 |
| 2008/0052408 A1 | 2/2008 | Saito et al. | |

(Continued)

FOREIGN PATENT DOCUMENTS

| CN | 101137043 A | 3/2008 |
|---|---|---|
| CN | 101155298 A | 4/2008 |

(Continued)

OTHER PUBLICATIONS

Written Opinion of the International Searching Authority issued in corresponding PCT Patent Application No. PCT/CN2010/074110, mailed Sep. 23, 2010.

(Continued)

*Primary Examiner* — Mulugeta Mengesha
(74) *Attorney, Agent, or Firm* — Brinks Gilson & Lione (57) ABSTRACT

A method, an equipment and a system for reducing a media delay are disclosed. A media processing unit receives a media switching request sent from a media receiving unit, and sends a response message and a media stream of a second media service to the media receiving unit according to the media switching request, where the response message includes information for the media receiving unit to reduce the media delay, so that the media receiving unit performs a media quickening process on the media stream of the second media service according to the received message including the information for reducing the media delay. An equipment and a system for reducing a media delay are also provided, which increase the switching efficiency of the media streams, reduce the difference of the display delay among different user media, and improve the degree of user experience.

20 Claims, 4 Drawing Sheets

(56) References Cited

U.S. PATENT DOCUMENTS

| | | |
|---|---|---|
| 2008/0152312 A1 | 6/2008 | Levy et al. |
| 2008/0192839 A1 | 8/2008 | Gahm et al. |
| 2009/0064242 A1 | 3/2009 | Cohen et al. |
| 2011/0161765 A1 | 6/2011 | Oran |

FOREIGN PATENT DOCUMENTS

| | | |
|---|---|---|
| CN | 101267538 A | 9/2008 |
| CN | 101316357 A | 12/2008 |
| EP | 1879393 A2 | 1/2008 |
| JP | 2008022507 A | 1/2008 |
| WO | WO 00/57646 A1 | 9/2000 |
| WO | WO 2008/151987 A1 | 12/2008 |

OTHER PUBLICATIONS

International Search Report issued in corresponding PCT Patent Application No. PCT/CN2010/074110, mailed Sep. 23, 2010.
Extended European Search Report issued in corresponding European Patent Application No. 10793565.2, mailed Feb. 5, 2013.
Office Action issued in corresponding Chinese Patent Application No. 200910108543.4, mailed Jan. 14, 2013.
Search Report issued in corresponding Chinese Patent Application No. 200910108543.4, dated Dec. 20, 2012.
Begen et al., "Reducing Channel-Change Times with the Real-Time Transport Protocol" IEEE Internet Computing 2009.
Office Action issued in corresponding Japanese Patent Application No. 2012-515346, mailed Apr. 23, 2013.

* cited by examiner

FIG. 8

METHOD, EQUIPMENT AND SYSTEM FOR REDUCING MEDIA DELAY

CROSS-REFERENCE TO RELATED APPLICATIONS

This application is a continuation of International Application No. PCT/CN2010/074110, filed on Jun. 19, 2010, which claims priority to Chinese Patent Application No. 200910108543.4, filed with the Chinese Patent Office on Jun. 30, 2009, both of which are hereby incorporated by reference in their entireties.

FIELD

The present disclosure relates to network security technologies in the field of communications, and in particular, to a method, an equipment and a system for reducing a media delay.

BACKGROUND

In the process of transferring a media service such as a Digital Television (DTV) or an Internet Protocol (IP) Television (IPTV) service through a multicast technology, the video data rate is reduced by a video encoding compression technology such as Moving Picture Experts Group (MPEG-2), MPEG-4, H.264, Video Codec 1 (VC-1), digital Audio Coding Standard (AVS), or Scalable Video Coding (SVC), which ensures the transmission and playing of media when the transmission bandwidth is limited. As the video encoding compression technologies adopt intra-frame and inter-frame compression schemes, when an end user does not receive any random access point (for example, only receives an inter-frame compressed video frame such as a B or P frame, but does not receive any intra-frame compressed video frame (for example, an Instantaneous Decoding Refresh (IDR) or I frame), the end user cannot perform decoding to play the video. Generally, the end user starts decoding and playing only when receiving a random access point (for example, an inter-frame compressed frame), which, however, causes a delay in the playing of media images. For example, when the user switches from one channel to another channel, the new channel cannot be played immediately. To solve the problem, when the user requests for a new multicast group (switching from one multicast group to another multicast group, or joining a multicast group for the first time), that is, requests for a new media channel (switching from one media channel to another media channel, or acquiring a media channel for the first time), a network equipment does not directly forward the media stream currently being forwarded through multicast to the user, but forwards the media stream starting from a previous random access point (if the current multicast point is close to a next random access point, the media stream may be forwarded immediately), so that media decoding and display may be rapidly performed on the media stream received by the user, thereby reducing the delay caused by waiting for the media for the user. This technology is referred to as a rapid channel switching technology, and may also be referred to as a Rapid Acquisition of Multicast Session (RAMS) technology.

Figure 1:
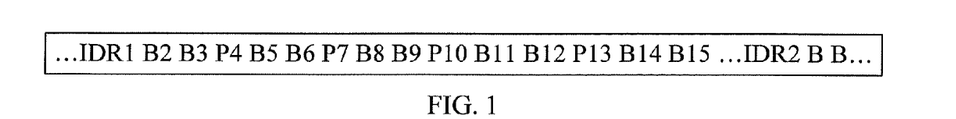
FIG. 1 shows a sending sequence of a media stream in the prior art.

To improve the user experience of rapid video viewing, the RAMS technology or the rapid channel switching technology may be adopted to solve the problem. When the user performs channel switching, the media receiving unit (such as a Set Top Box, STB) requests a network for media streams of a new channel, a network equipment first forwards, according to the current media stream condition, a media stream starting from a previous random access point to the media receiving unit, and the media receiving unit may directly perform decoding and media display after receiving the media stream without waiting for a next random access point; that is to say, for a media stream, a technical solution in the prior art is as shown by a sending sequence of a video service stream in FIG. 1, where when a new video stream is requested between two random access points, for example, between IDR1 and IDR2 in FIG. 1, the video stream will be sent starting from IDR1. If the video stream starts from one random access point and ends at a next random access point but does not include a code stream segment of the next random access point so as to form a Group of Picture (GOP), when rapid channel switching is requested within one GOP, the media stream of the new channel is sent starting from an intra-frame encoded frame of the GOP such as IDR1.

In the process of researching and practicing the prior art, the inventors find that the prior art has the following problems.

When the user requests for a new media stream, to improve the user experience of video viewing, the video data stream is sent starting from a starting intra-frame encoded frame of the GOP such as IDR1, that is, within one GOP, regardless of when the user requests for a new media stream, the network sends media data starting from the starting intra-frame encoded frame of the GOP. In this way, as different users request for new media streams at different time points, the users experience different viewing delays, that is, video frame delays, when viewing the same media service. That is to way, different images are displayed when the users are viewing the same media service at the same time.

Therefore, when an image of a B2 frame is being displayed for one user, another user may be viewing an image of a B15 frame. The longest video display delay among different users may be up to the length of one GOP, that is, one user is viewing an image of IDR1, while the other user may be viewing an image of an IDR2 frame. In this way, if two users viewing the same channel discuss the program with each other by phone, one user may talk about the content that the other user has not viewed, resulting in poor user experience of video watching.

SUMMARY

Embodiments of the present disclosure provide a method, an equipment and a system for reducing a media delay, which are used to reduce the difference among different user media due to asynchronous playing, so that synchronous media playing can be achieved among different users within a certain range, thereby improving the degree of user experience.

According to a first aspect of the present disclosure, a method for reducing a media delay is provided. The method includes: receiving a media switching request, sent from a media receiving unit, for switching from a first media service to a second media service; and sending a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay.

According to a second aspect of the present disclosure, another method for reducing a media delay is provided. The method includes: sending a media switching request for switching from a first media service to a second media service to a media processing unit; receiving a response message and a media stream of the second media service that are returned by the media processing unit, where the response message carries information for reducing the media delay by a media receiving unit, and the information includes the number of delayed frames and/or frame delay time; and performing a quickening process on the media stream of the second media service according to the information for reducing the media delay carried in the response message.

According to a third aspect of the present disclosure, an equipment for reducing a media delay is provided. The equipment includes: a first receiving module, configured to receive a media switching request, sent from a media receiving unit, for switching from a first media service to a second media service; and a notification module, configured to send a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay.

According to a fourth aspect of the present disclosure, an equipment for reducing a media delay is provided. The equipment includes: a second sending module, configured to send a media switching request for switching from a first media service to a second media service to a media processing unit; a second receiving module, configured to receive a response message and a media stream of the second media service that are returned by the media processing unit, where the response message carries information for reducing the media delay by a media receiving unit, and the information includes the number of delayed frames and/or frame delay time; and a processing module, configured to perform a quickening process on the media stream of the second media service according to the information for reducing the media delay carried in the response message.

According to a fifth aspect of the present disclosure, a system for reducing a media delay is provided. The system includes: a media processing unit, configured to receive a media switching request, sent from a media receiving unit, for switching from a first media service to a second media service; and send a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay; and a media receiving unit, configured to send a media switching request for switching from a first media service to a second media service to a media processing unit; receive a response message and a media stream of the second media service that are returned by the media processing unit; and perform a quickening process on the media stream of the second media service according to the information for reducing the media delay carried in the response message.

The embodiments of the present disclosure provide a method, an equipment and a system for reducing a media delay, in which a media processing unit receives a media switching request sent from a media receiving unit, carries information for the media receiving unit to reduce the media delay in a response message, and sends the response message to the media receiving unit, so that the media receiving unit performs a media quickening process according to the response message, thereby reducing the difference of the display delay among different user media, and improving the degree of user experience.

BRIEF DESCRIPTION OF THE DRAWINGS

To illustrate the solutions according to the embodiments of the present disclosure or in the prior art more clearly, the accompanying drawings required for describing the embodiments or the prior art are introduced below briefly. Apparently, the accompanying drawings in the following descriptions merely show some of the embodiments of the present disclosure, and persons of ordinary skill in the art can obtain other drawings according to the accompanying drawings without creative efforts.

DETAILED DESCRIPTION OF THE EMBODIMENTS

The solutions according to the embodiments of the present disclosure will be clearly described below with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure. As used herein, the term "and/or" includes any and all combinations of one or more of the associated listed items.

Figure 2A:
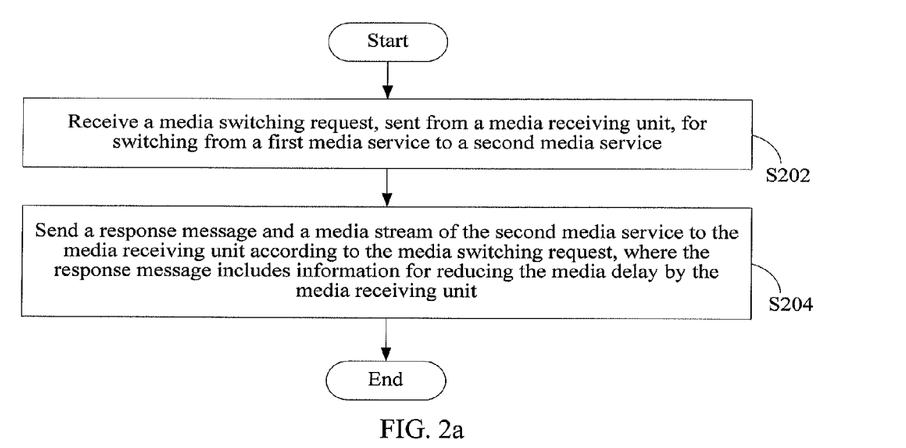
FIG. 2a is a flow chart of a method for reducing a media delay according to an embodiment of the present disclosure.

As shown in FIG. 2a, which is a flow chart of a method for reducing a media delay according to an embodiment of the present disclosure, which includes the following steps.

Step 202: Receive a media switching request, sent from a media receiving unit, for switching from a first media service to a second media service.

The media receiving unit is a terminal equipment for a user to view a media service and initiate a switching request, such as an STB, a computer or a media phone, and the media switching request of the media receiving unit may be triggered by the user operating a remote controller or other software or hardware terminals.

When performing media service switching, the media receiving unit initiates a media switching request to a network buffer unit, where the request includes requested channel information. The request may use a Real-time Transport Control Protocol (RTCP), an RTCP extension, or other protocols or dedicated signaling.

The switching from the first media service to the second media service further includes the situation that the media receiving unit requests for a media service for the first time, for example, if the media receiving unit is started and requests for a desired media service for the first time, the media switching request does not include the first media service at this time. The switching request may further include instruction information of requesting for processing of reducing the media delay, and the instruction information is used by the media receiving unit to request the media processing unit to feed back the information for reducing the media delay. After receiving the request, the network buffer unit sends the information for reducing the media delay to the media receiving unit, so that the media receiving unit performs the processing of reducing the media delay according to the information. The switching request may also not include the instruction information, and the media processing unit actively instructs the media receiving unit to perform the processing of reducing the media delay. The media switching request may be implemented through an extended RTCP message.

Step 204: Send a response message and a media stream of the second media service to the media receiving unit according to the media switching request, where the response message includes information for the media receiving unit to reduce the media delay. The information for the media receiving unit to reduce the media delay includes the number of delayed frames and/or frame delay time, so that the media receiving unit performs a media quickening process on the media stream of the second media service according to the received message including the information for reducing the media delay.

The information for the media receiving unit to reduce the media delay further includes any one or combination of: a frame rate, a sending rate or sending rate multiplier, and a frame discard or frame jump interval.

Figure 4:
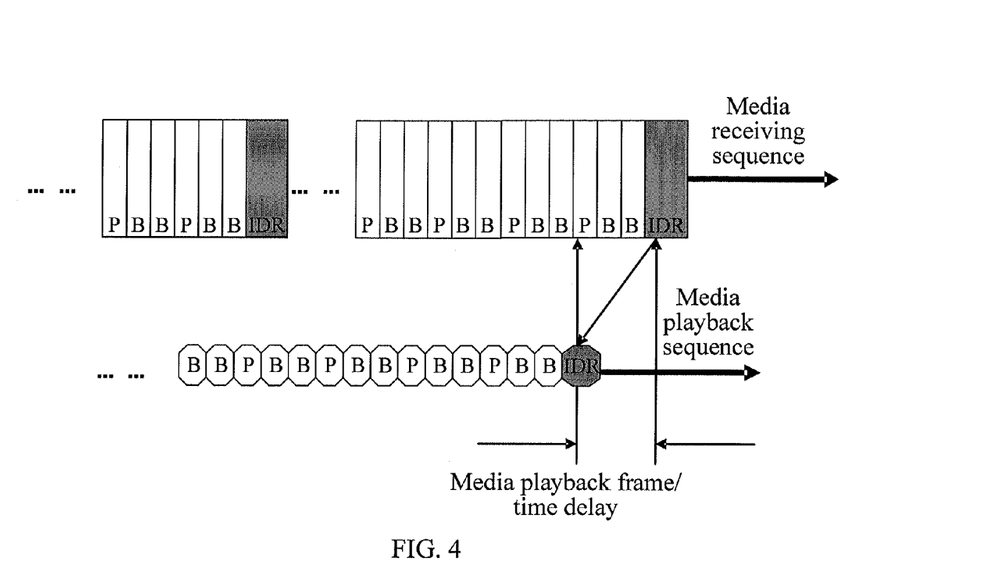
FIG. 4 is a schematic diagram showing an intrinsic media playing delay of a media receiving unit according to an embodiment of the present disclosure.

Specifically, the number of delayed media frames represents a media frame delay distance, or a sum of the media frame delay distance and an intrinsic media playing frame delay of the media receiving unit (as shown in FIG. 4).

The media frame delay time represents a media time delay distance, or a sum of the media time delay distance and an intrinsic media playing time delay of the media receiving unit (as shown in FIG. 4).

Figure 5:
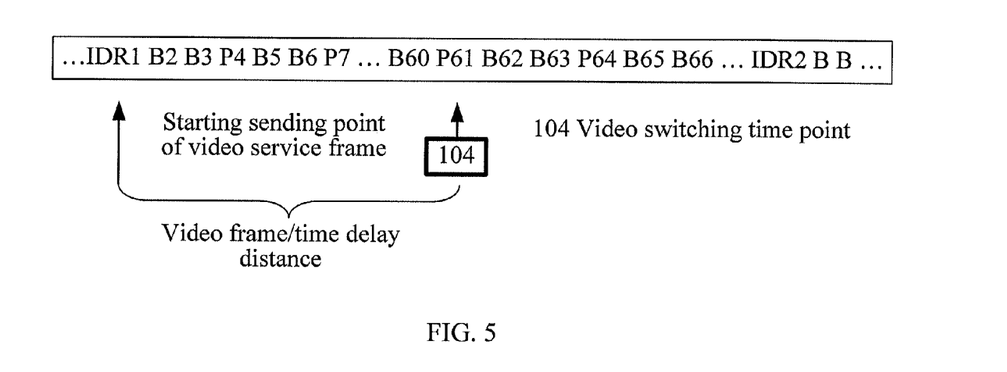
FIG. 5 is a schematic diagram showing a delay of a media frame requesting for media switching according to an embodiment of the present disclosure.

The media frame delay distance is a frame delay distance between sequential positions of a frame of the media stream to be received and a frame of the media stream being requested (as shown in FIG. 5). The media time delay distance is normal playing time for playing the "number of delayed media frames" by the media receiving unit (as shown in FIG. 5). (Please refer to the description of the embodiment in FIG. 3 for details).

The frame rate represents a playing rate after the media service stream is received. The sending rate or sending rate multiplier of the media service stream represents a sending rate at which the media service stream is being sent or a multiplier of a normal stream rate. The frame discard or frame jump interval, that is, an interval as recommended by the media processing unit at which the media receiving unit performs frame discard or frame jump during media display, specifically represents that playing is performed in a manner of jumping by one frame every certain number of frames.

After step 204, the method further includes: sending the media stream of the second media service to the media receiving unit through unicast or multicast.

The embodiment of the present disclosure provides a method for reducing a media delay, in which a media processing unit receives a media switching request sent from a media receiving unit; and according to the media switching request, carries, in a response message, information for the media receiving unit to reduce the media delay, and sends the response message to the media receiving unit, so that the media receiving unit performs a media quickening process according to the response message, which increases the switching efficiency of the media streams, reduces the difference of the display delay among different user media, achieves as synchronous playing among different users as possible, and improves the degree of user experience.

Figure 2B:
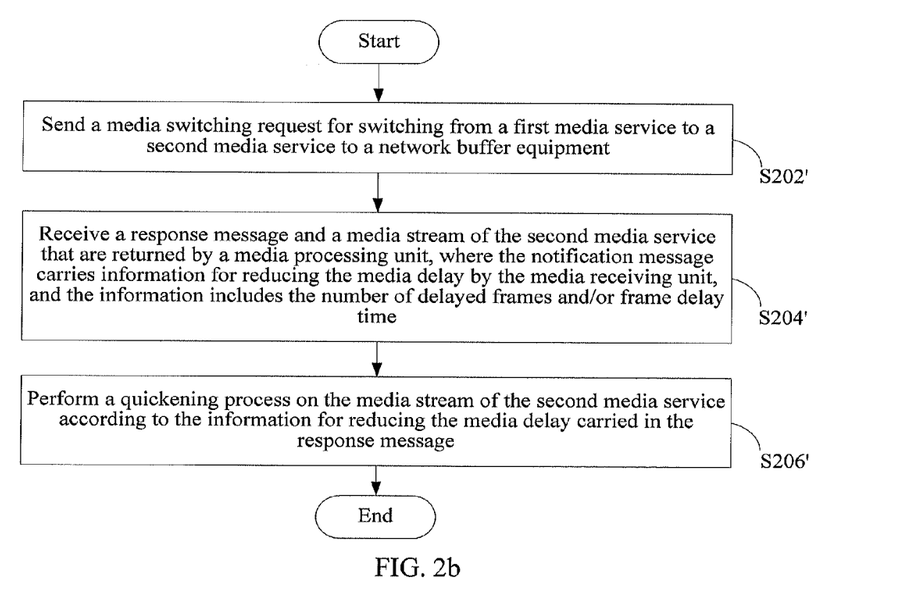
FIG. 2b is a flow chart of another method for reducing a media delay according to an embodiment of the present disclosure.

FIG. 2*b* is a flow chart of another method for reducing a media delay according to an embodiment of the present disclosure, which includes the following steps.

Step 202': Send a media switching request for switching from a first media service to a second media service to a media processing unit.

The media processing unit and a media receiving unit are media network processing equipments receiving a media service switching request, such as intermediate network units, retransmission servers or media servers. In other words, the media processing unit and media receiving unit may be servers having a processor configured to implement the disclosed method.

Step 204': Receive a response message and a media stream of the second media service that are returned by the network buffer equipment, where the response message carries information for the media receiving unit to reduce the media delay, and the information includes the number of delayed frames and/or frame delay time.

The information for the media receiving unit to reduce the media delay further includes any one or combination of: a frame rate, a sending rate or sending rate multiplier of a media stream, and a frame discard or frame jump interval.

Specifically, the number of delayed media frames represents a media frame delay distance, or a sum of the media frame delay distance and an intrinsic media playing frame delay of the media receiving unit (as shown in FIG. 4, and to be described in detail in the description of FIG. 3 below).

The media frame delay time represents a media time delay distance, or a sum of the media time delay distance and an intrinsic media playing time delay of the media receiving unit (as shown in FIG. 4).

The media frame delay distance is a frame delay distance between sequential positions of a frame of the media stream to be received and a frame of the media stream being requested (as shown in FIG. 5, and to be described in detail in the description of FIG. 5 below). The media time delay distance is normal playing time for playing the "number of delayed media frames" by the media receiving unit (as shown in FIG. 5).

The frame rate represents a playing rate after the media service stream is received. The sending rate or sending rate multiplier of the media service stream represents a sending rate at which the media service stream is being sent or a multiplier of a normal stream rate. The frame discard or frame jump interval, that is, an interval as recommended by the media processing unit at which the media receiving unit performs frame discard or frame jump during media display, specifically represents that playing is performed in a manner of jumping by one frame every certain number of frames.

Step 206': Perform a quickening process on the media stream of the second media service according to the information for reducing the media delay carried in the response message.

Playing of the media stream of the second media service is quickened through any one or combination of processing media frames at an interval, fast forwarding media frames and quickly decoding media frames.

The embodiment of the present disclosure provides a method for reducing a media delay, in which a media receiving unit sends a media switching request to a media processing unit; and performs, according to information for the media receiving unit to reduce the media delay which is carried in a response message returned by the media processing unit, a media quickening process on a media service stream of the second channel sent by the media processing unit, which increases the switching efficiency of the media streams, reduces the difference of the display delay among different user media, and improves the degree of user experience.

Figure 3:
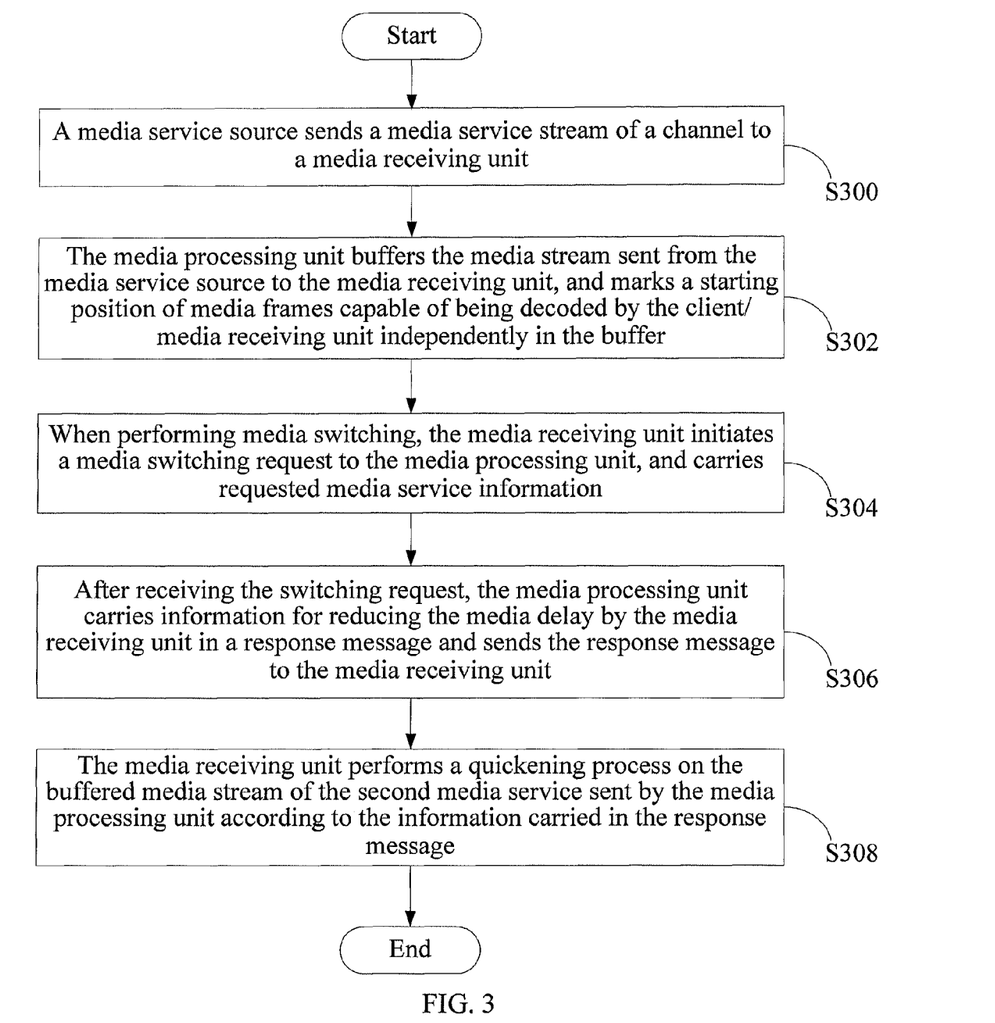
FIG. 3 is a flow chart of a specific implementation of a method for reducing a media delay according to an embodiment of the present disclosure.

FIG. 3 is a flow chart of a specific implementation of a method for reducing a media delay according to an embodiment of the present disclosure, which includes the following steps.

Step 300: A media service source sends a media service stream of a channel to a media receiving unit.

The media service source, which may also be referred to as a head-end equipment, is a source equipment initiating the media service stream, the type of which may include a multicast source, a media server, a central media server, and an edge media server. A manner of acquiring the media service stream by the media service source includes recording from a satellite television or forwarding from other wired networks. Network nodes include equipments deployed by the operator, such as a Digital Subscriber Line Access Multiplexer (DSLAM) equipment, an Optical Line Terminal (OLT) equipment, a router equipment, a network access server and an IP switch. The network connection between the media service source and the network nodes may be implemented through a core network, a metropolitan area network, a convergence network, or other networking manners.

The media receiving unit (also referred to as a client) is a terminal equipment for a user to view a media service and initiate a switching request, such as an STB, a computer or a media phone, and the media switching request of the media receiving unit may be triggered by the user operating a remote controller or other software or hardware terminals.

Step 302: The media processing unit buffers the media stream sent from the media service source to the media receiving unit, and marks a starting position of media frames capable of being decoded by the media receiving unit independently in the buffer (for example, I frame, or IDR frame position).

When the media service source equipment sends the media service stream to the media receiving unit (which may be construed as that the media service source sends the media stream to the media receiving unit through a network node), the media processing unit acquires and buffers the media service stream, or when the media service source sends the media stream to the media receiving unit, the media processing unit acquires the media stream by mirroring or joining a multicast group and buffers the media stream, where the media service stream is a code stream of the media service provided for the user.

Step 304: When performing media switching, the media receiving unit initiates a media switching request to a network buffer unit, and carries requested media service information.

When the user intends to perform media service switching, the media receiving unit sends a media switching request to the media processing unit to request for switching from a first media service to a second media service. The media switching request may use an RTCP, an RTCP extension, or other dedicated or private protocols or signaling.

The switching from the first media service to the second media service further includes the situation that the media receiving unit requests for a media service for the first time, for example, if the media receiving unit is started and requests for a desired media service for the first time, the media switching request does not include the first media service at this time. The switching request may further include instruction information of requesting for processing of reducing the media delay, and the instruction information is used by the media receiving unit to request the media processing unit to feed back the information for reducing the media delay. After receiving the request, the network buffer unit sends the information for reducing the media delay to the media receiving unit, so that the media receiving unit performs the processing of reducing the media delay according to the information. The switching request may also not include the instruction information, and the media processing unit actively instructs the media receiving unit to perform the processing of reducing the media delay.

The instruction information, used by the media receiving unit to request the media processing unit to feed back the information for reducing the media delay, may be implemented through an extended RTCP message, for example, implemented through an RTCP Rapid Acquisition of Multicast Session-Request (RAMS-R) message.

Step 306: After receiving the media switching request of the user, the network buffer equipment sends a response message and a media stream of the second media service to the media receiving unit, where the response message includes information for the media receiving unit to reduce the media delay. The information for the media receiving unit to reduce the media delay includes the number of delayed frames and/or frame delay time.

The response message, that is, the information used by the network buffer unit to instruct the media receiving unit to reduce the video delay, may be implemented through an extended RTCP message, for example, implemented through Rapid Acquisition of Multicast Session-Information (RAMS-I).

The information for the media receiving unit to reduce the media delay further includes any one or combination of: a frame rate, a sending rate or sending rate multiplier, and a frame discard or frame jump interval.

The information further includes any one or combination of: a frame rate, a sending rate or sending rate multiplier, and a frame discard or frame jump interval.

The contents included by the media frame delay information are explained below with reference to FIG. 4 and FIG. 5.

FIG. 4 is a schematic diagram showing an intrinsic media playing delay of a media receiving unit according to an embodiment of the present disclosure; FIG. 5 is a schematic diagram showing a delay of media frames requesting for media switching according to an embodiment of the present disclosure.

FIG. 4 shows a situation that the media playing time of a media receiving unit (or client) is later than the media receiving time by an intrinsic playing delay. Specifically, when receiving a media stream, a media receiving unit does not immediately display the media stream, but instead, plays the media stream after a certain processing delay. The delay may be referred to as "media playing time delay" or "media playing frame delay" as shown in FIG. 4.

FIG. 5 shows a delay of a video service frame between a request point of media service switching and a starting sending point of the video service frame. In FIG. 5, IDR1 is the starting sending point of the video service frame, 104 is P61 of the video service frame, being a request point of media switching (which may also be a media switching time point), and the difference between IDR1 and P61 is the delay distance of the video frame shown in FIG. 5.

Specifically, the number of delayed media frames represents a media frame delay distance, or a sum of the media frame delay distance and an intrinsic media playing frame delay of the media receiving unit (as shown in FIG. 4).

The media frame delay time represents a media time delay distance, or a sum of the media time delay distance and an intrinsic media playing time delay of the media receiving unit (as shown in FIG. 4).

The media frame delay distance is a frame delay distance between sequential positions of a frame of the media stream to be received and a frame of the media stream being requested (as shown in FIG. 5). The media time delay distance is normal playing time for playing the "number of delayed media frames" by the media receiving unit (as shown in FIG. 5).

The frame rate represents a playing rate after the media service stream is received. The sending rate or sending rate multiplier of the media service stream represents a sending rate at which the media service stream is being sent or a multiplier of a normal stream rate. The frame discard or frame jump interval, that is, an interval as recommended by the media processing unit at which the media receiving unit performs frame discard or frame jump during media display, specifically represents that playing is performed in a manner of jumping by one frame every certain number of frames.

Step 308: The media receiving unit performs, according to the information carried in the response message, a quickening process on the buffered media service stream of the second channel sent by the media processing unit.

Specifically, taking FIG. 5 for example, FIG. 5 is a schematic diagram showing a delay of media service frames. A specific manner of performing the quickening process on the media service stream by the media receiving unit is described with reference to FIG. 5.

The media receiving unit performs the quickening process according to the information carried by the media processing unit, and three processing manners may be used, namely, a manner of processing media frames at an interval, a fast forwarding manner and a quick decoding manner. The three manners are provided by way of example only, but are not intended to limit the present disclosure.

First manner: processing media frames at an interval, for example, for the following media stream: "IDR1B2B3P4B5B6P7B8B9P10B11B12P13B14B15P16B 17B18P19B20B21P22B23B24P25B26B 27P28B29B30 P31 . . . B60 P61 B62 B63 P64 B65 B66 . . . "

For this example, if the sending rate of the media stream is 1.3 times that of a normal multicast stream, the number of delayed frames is 60 (the frame delay time being 2 seconds (s)), and the media frame processing interval is 15 frames (the sending rate multiplier of the media stream has to be greater than the media frame processing interval, otherwise the media quickening process cannot be performed. That is to say, media frame processing interval/(media frame processing interval−1)<sending rate of the media stream, in this example, 1.3>15/14), the frame rate (frames per second, FPS)=30. The media receiving unit plays at a frame rate of 30, which is implemented by jumping by one frame every 15 frames, that is to say, after playing frame B14, the media receiving unit does not play frame P15, but instead, directly plays frame B16. By analogy, 2 frames are save from being played for every 30 frames, and accordingly, 60 frames are save from being played for 900 frames, that is, the number of delayed frames being 60 is reached. In other words, the playing time is reduced by 2 s for every 30 s (900 frames), which reaches the frame delay time. In this way, the media receiving unit 104 views the same media image as other users within 30−2=28 s.

The process of reducing the media delay among different users by the media receiving unit may be completed before or after the multicast stream is received. Such a media catching manner depends on the acquisition of the information for reducing the media delay among users.

Second manner: fast forwarding. Specifically, the media receiving unit performs a media fast forwarding process on the received media service stream for media catching according to the information for reducing the media delay among users. For this example, if the sending rate of the media stream is 1.3 times that of a normal multicast stream, the number of delayed frames is 60 (the frame delay time being 2 s), and the media frame processing interval is 16 frames, the frame rate FPS=32.

In this manner, the media frame processing interval may also be referred to as a media frame fast forwarding interval. For example, the media frame processing interval is 16 frames, indicating that 16 frames of the media stream, which originally needs to be played within (16/30=0.533 s), can be played within time for playing 15 frames (0.5 s) in fact. 32 frames can be played within time originally for playing 30 frames, that is to say, the frame rate is 32 at this time. Only the time for playing 900 frames (30 s) is required to play 960 frames (normally 32 s is required), quickened by the playing time of 60 frames (2 s). In this way, the media receiving unit 104 views the same media image as other users within 32−2=30 s.

Third manner: quick decoding.

Specifically, the quick decoding manner is mainly to perform quick media decoding after receiving the media service stream, and display the media service stream after a media display start frame number or a certain moment is reached, rather than immediately display the media service stream. For example, in a situation, the number of delayed media frames is 10, but the media display start frame number should be not greater than the number of delayed media frames, and should be 1 to 10. If the number of delayed media frames is 5, it indicates that the media receiving unit does not display until frame B5 is decoded, and quickly decodes the media frames before media display. As the decoding rate is far greater than the media display rate, the display delay among different users may be reduced.

The embodiment of the present disclosure provides a channel switching method, in which a media processing unit receives a media switching request sent from a media receiving unit; and sends a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay, which increases the switching efficiency of the media streams, reduces the difference of the display delay among different user media, and improves the degree of user experience.

Figure 6:
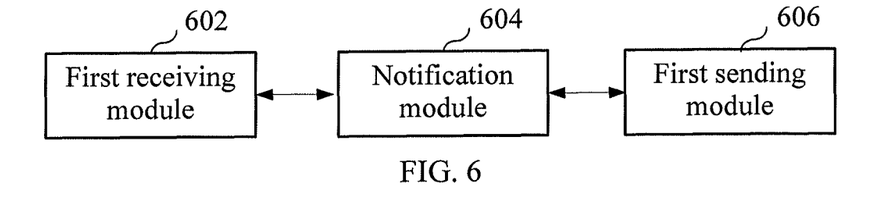
FIG. 6 is a structural diagram of an equipment for reducing a media delay according to an embodiment of the present disclosure.

FIG. 6 is a structural diagram of an equipment for reducing a media delay according to an embodiment of the present disclosure, which includes:

a first receiving module 602, configured to receive a media switching request, sent from a media receiving unit, for switching from a first media service to a second media service; and a notification module 604, configured to send a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay.

The information for the media receiving unit to reduce the media delay further includes any one or combination of: a frame rate, a sending rate or sending rate multiplier of a media service stream, and a frame discard or frame jump interval.

Specifically, the number of delayed media frames represents a media frame delay distance, or a sum of the media frame delay distance and an intrinsic media playing frame delay of the media receiving unit (as shown in FIG. 4).

The media frame delay time represents a media time delay distance, or a sum of the media time delay distance and an intrinsic media playing time delay of the media receiving unit (as shown in FIG. 4).

The media frame delay distance is a frame delay distance between sequential positions of a frame of the media stream to be received and a frame of the media stream being requested. The media time delay distance is normal playing time for playing the "number of delayed media frames" by the media receiving unit.

The frame rate represents a playing rate after the media service stream is received. The sending rate or sending rate multiplier of the media service stream represents a sending rate at which the media service stream is being sent or a multiplier of a normal stream rate. The frame discard or frame jump interval, that is, an interval as recommended by a media processing unit at which the media receiving unit performs frame discard or frame jump during media display, specifically represents that playing is performed in a manner of jumping by one frame every certain number of frames. (Please refer to the description of the embodiment in FIG. 3 for details, which will not be described herein again).

The equipment further includes:

a first sending module 606, configured to send the buffered media stream of the second media service to the media receiving unit quickly through unicast or multicast.

The equipment for reducing a media delay may be, but is not limited to, a media processing unit, and may be any network equipment for buffering a real-time multicast media stream of each media service, receiving a request message sent by the media receiving unit, and performing corresponding processing according to the request message.

When performing media service switching, the media receiving unit initiates a media switching request to a network buffer unit, where the request includes requested channel information. The request may use an RTCP, an RTCP extension, or other protocols or dedicated signaling.

The switching from the first media service to the second media service further includes the situation that the media receiving unit requests for a media service for the first time, for example, if the media receiving unit is started and requests for a desired media service for the first time, the media switching request does not include the first media service at this time. The switching request may further include instruction information for instructing the media processing unit to feed back the information for reducing the media delay. The switching request may also not include the instruction information, and the media processing unit feeds back the information according to the received message. The media switching request may be implemented through an extended RTCP message.

The embodiment of the present disclosure provides an equipment for reducing a media delay, in which a media processing unit receives a media switching request sent from a media receiving unit; and sends a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay, which increases the switching efficiency of the media streams, reduces the difference of the display delay among different user media, and improves the degree of user experience.

Figure 7:
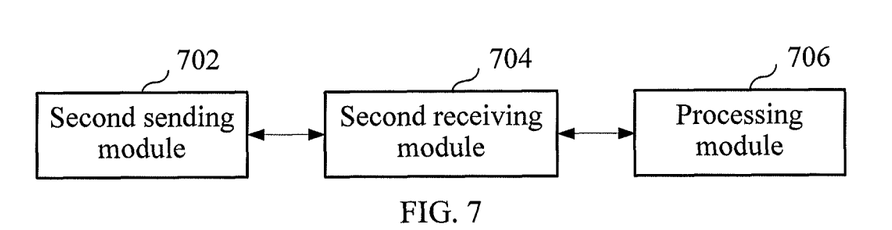
FIG. 7 is a structural diagram of another equipment for reducing a media delay according to an embodiment of the present disclosure.

FIG. 7 is a structural diagram of another equipment for reducing a media delay according to an embodiment of the present disclosure, which includes:

a second sending module 702, configured to send a media switching request for switching from a first media service to a second media service to a media processing unit;

a second receiving module 704, configured to receive a response message and a media stream of the second media service that are returned by the media processing unit, where the response message carries information for reducing the media delay by a media receiving unit, and the information includes the number of delayed frames and/or frame delay time; and a processing module 706, configured to perform a quickening process on the media stream of the second media service according to the information for reducing the media delay carried in the response message.

The information for the media receiving unit to reduce the media delay further includes any one or combination of: a frame rate, a sending rate or sending rate multiplier of a media stream, and a frame discard or frame jump interval.

Specifically, the number of delayed media frames represents a delay distance between sequential positions of a frame of the media stream to be received and a frame of the media stream being requested. The media frame delay time represents normal playing time for playing the "number of delayed media frames" by the media receiving unit.

The frame rate represents a playing rate after the media service stream is received. The sending rate or sending rate multiplier of the media service stream represents a sending rate at which the media service stream is being sent or a multiplier of a normal stream rate. The frame discard or frame jump interval, that is, an interval as recommended by the media processing unit at which the media receiving unit performs frame discard or frame jump during media display, specifically represents that playing is performed in a manner of jumping by one frame every certain number of frames.

The media switching request further includes instruction information for instructing the media processing unit to return the information for reducing the media delay, and the media switching request is implemented through an extended RTCP message.

The equipment for reducing a media delay may be, but is not limited to, a media receiving unit, and may be any terminal equipment for the user to view a media service and initiate a switching request, such as an STB, a computer or a media phone, and the media switching request of the media receiving unit may be triggered by the user operating a remote controller or other software or hardware terminals.

The embodiment of the present disclosure provides an equipment for reducing a media delay, in which a media switching request is sent to a media processing unit to request for switching from a first media service to a second media service; a response message returned by the media processing unit is received, where the response message carries information for reducing the media delay by a media receiving unit, and the information includes the number of delayed frames and/or frame delay time; and a quickening process is performed on a buffered media service stream of the second channel sent by the media processing unit according to the information carried in the response message, which increases the switching efficiency of the media streams, reduces the difference of the display delay among different user media, and improves the degree of user experience.

It should be noted that, the equipment for reducing a media delay in the embodiment of the present disclosure is not intended to limit the solutions of the present disclosure, and the apparatus capable of reducing a media delay may be, but is not limited to, a media processing unit or a media receiving unit, and also includes equipments at other network positions or may be built in a network node, implementing the same functions as those described above.

Figure 8:
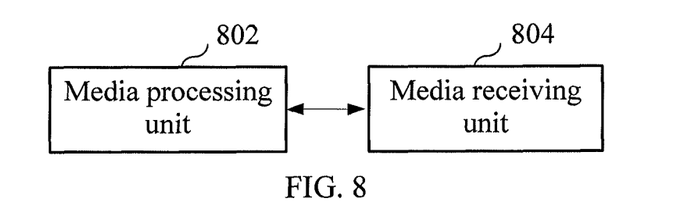
FIG. 8 is a structural diagram of a system for reducing a media delay according to an embodiment of the present disclosure.

FIG. 8 is a structural diagram of a system for reducing a media delay according to an embodiment of the present disclosure, which includes:

a media processing unit 802, configured to receive a media switching request, sent from a media receiving unit, for switching from a first media service to a second media service; and send a response message and a media stream of the second media service to the media receiving unit according to the media switching request, where the response message includes information for the media receiving unit to reduce the media delay, and the information for the media receiving unit to reduce the media delay includes the number of delayed frames and/or frame delay time, so that the media receiving unit performs a media quickening process on the media stream of the second media service according to the received message including the information for reducing the media delay; and a media receiving unit 804, configured to send a media switching request for switching from a first media service to a second media service to a media processing unit; receive a response message and a media stream of the second media service that are returned by the media processing unit; and perform a quickening process on the media stream of the second media service according to the information for reducing the media delay carried in the response message.

The switching from the first media service to the second media service further includes the situation that the media receiving unit requests for a media service for the first time, for example, if the media receiving unit is started and requests for a desired media service for the first time, the media switching request does not include the first media service at this time. The switching request may further include instruction information for instructing the media processing unit to feed back the information for reducing the media delay. The switching request may also not include the instruction information, and the media processing unit feeds back the information according to the received message.

The media processing unit is further configured to send the buffered the media service stream of the second media service to the media receiving unit.

The information for the media receiving unit to reduce the media delay further includes any one or combination of: a frame rate, a sending rate or sending rate multiplier, and a frame discard or frame jump interval.

The media processing unit is a media network processing equipment receiving a media service switching request, such as an intermediate network unit, a retransmission server or a media server.

The media receiving unit is a terminal equipment for a user to view a media service and initiate a switching request, such as an STB, a computer or a media phone, and the media switching request of the media receiving unit may be triggered by the user operating a remote controller or other software or hardware terminals.

The embodiment of the present disclosure provides a system for reducing a media delay, in which through interaction of a media processing unit and a media receiving unit, the media processing unit sends a response message and a media stream of the second media service to the media receiving unit according to the media switching request, where the response message includes information for the media receiving unit to reduce the media delay, so that the media receiving unit performs a media quickening process on the media stream of the second media service according to the message including the information for reducing the media delay, which reduces the delay of the media stream image, reduces the difference of the display delay among different user media, and improves the degree of user experience.

Through the above description of the embodiments, it is apparent to persons skilled in the art that the present disclosure may be accomplished by software on a necessary universal hardware platform, or accomplished by hardware. The hardware platform or hardware includes servers having processors configured to implement the disclosed methods. Therefore, the solutions of the present disclosure or the part that makes contributions to the prior art can be substantially embodied in the form of a software product. The computer software product may be stored in a storage medium, and includes instructions to instruct a terminal equipment (for example, a mobile phone, a personal computer, a server, or a network equipment) to perform the method according to the embodiments of the present disclosure.

Although the present disclosure is described above with some exemplary embodiments, the protection scope of the present disclosure is not limited thereto. Various modifications and variations that can be easily occurred to persons skilled in the art in the technical scope disclosed in the present disclosure are contemplated in the protection scope of the present disclosure. Therefore, the protection scope of the present disclosure is subject to the protection scope of the claims.

What is claimed is:

1. A method for reducing a media delay, comprising:
receiving a media switching request, sent from a media receiving unit, for switching from a first media service to a second media service; and
sending a media stream of the second media service to the media receiving unit according to the media switching request;
sending a response message to the media receiving unit according to the media switching request, wherein the response message comprises information for the media receiving unit to reduce the media delay, and the information for the media receiving unit to reduce the media delay comprises the number of delayed frames and frame delay time, the number of delayed frames representing a frame delay distance between sequential positions of a frame of the media stream to be received and a frame of the media stream being requested, the frame delay time representing a normal playing time for playing the number of delayed frames by the media receiving unit, the response message allowing the media receiving unit to perform a media quickening process on the media stream of the second media service according to the received information for reducing the media delay.

2. The method according to claim 1, wherein the information for the media receiving unit to reduce the media delay further comprises at least one of: a frame rate, a sending rate or sending rate multiplier of a media stream, and a frame discard or frame jump interval.

3. The method according to claim 1, further comprising:
sending the media stream of the second media service to the media receiving unit quickly through unicast or multicast.

4. The method according to claim 1, wherein the media switching request further comprises instruction information for instructing a media processing unit to return the information for reducing the media delay.

5. A method for reducing a media delay, comprising:
sending a media switching request for switching from a first media service to a second media service to a media processing unit;
receiving a media stream of the second media service that are returned by the media processing unit;
receiving a response message returned by the media processing unit according to the media switching request, wherein the response message carries information for reducing the media delay by a media receiving unit, and the information comprises the number of delayed frames and frame delay time, the number of delayed frames representing a frame delay distance between sequential positions of a frame of the media stream to be received and a frame of the media stream being requested, the frame delay time representing a normal playing time for playing the number of delayed frames by the media receiving unit; and
performing a quickening process on the media stream of the second media service according to the information for reducing the media delay carried in the response message.

6. The method according to claim 5, wherein the information for the media receiving unit to reduce the media delay further comprises at least one of: a frame rate, a sending rate or sending rate multiplier of a media stream, and a frame discard or frame jump interval.

7. The method according to claim 5, wherein the performing the quickening process on the media stream of the second media service comprises:
quickening playing of the media stream of the second media service through at least one of: processing media frames at an interval, fast forwarding media frames and quickly decoding media frames.

8. The method according to claim 5, wherein the media switching request further comprises instruction information for instructing the media processing unit to return the information for reducing the media delay.

9. An equipment for reducing a media delay, comprising:
a first receiving module, configured to receive a media switching request from a media receiving unit for switching from a first media service to a second media service; and
a notification module, configured to send a media stream of the second media service to the media receiving unit according to the media switching request, send a response message to the media receiving unit according to the media switching request, wherein the response message comprises information for the media receiving unit to reduce the media delay, and the information for the media receiving unit to reduce the media delay comprises the number of delayed frames and frame delay time, the number of delayed frames representing a frame delay distance between sequential positions of a frame of the media stream to be received and a frame of the media stream being requested, the frame delay time representing a normal playing time for playing the number of delayed frames by the media receiving unit, the response message allowing the media receiving unit to perform a media quickening process on the media stream of the second media service according to the received message comprising the information for reducing the media delay.

10. The equipment according to claim 9, wherein the information for the media receiving unit to reduce the media delay further comprises at least one of: a frame rate, a sending rate or sending rate multiplier of a media stream, and a frame discard or frame jump interval.

11. The equipment according to claim 10, further comprising:
a first sending module, configured to send the media stream of the second media service to the media receiving unit quickly through unicast or multicast.

12. The equipment according to claim 9, wherein the media switching request further comprises instruction information for instructing a media processing unit to return the information for reducing the media delay.

13. An equipment for reducing a media delay, comprising:
a second sending module, configured to send a media switching request for switching from a first media service to a second media service to a media processing unit;
a second receiving module, configured to receive a media stream of the second media service that are returned by the media processing unit, receive a response message returned by the media processing unit according to the media switching request, wherein the response message carries information for reducing the media delay by a media receiving unit, and the information comprises the number of delayed frames and frame delay time, the number of delayed frames representing a frame delay distance between sequential positions of a frame of the media stream to be received and a frame of the media stream being requested, the frame delay time representing a normal playing time for playing the number of delayed frames by the media receiving unit; and a processing module, configured to perform a quickening process on the media stream of the second media service according to the information for reducing the media delay carried in the response message.

14. The equipment according to claim 13, wherein the information for the media receiving unit to reduce the media delay further comprises at least one of a frame rate, a sending rate or sending rate multiplier of a media stream, and a frame discard or frame jump interval.

15. The equipment according to claim 13, wherein the media switching request further comprises instruction information for instructing the media processing unit to return the information for reducing the media delay.

16. A system for reducing a media delay, comprising:

a media processing unit, configured to receive a media switching request for switching from a first media service to a second media service sent from a media receiving unit; send a media stream of the second media service to the media receiving unit according to the media switching request, and send a response message to the media receiving unit according to the media switching request, wherein the response message comprises information for the media receiving unit to reduce the media delay, and the information for the media receiving unit to reduce the media delay comprises the number of delayed frames and frame delay time, the number of delayed frames representing a frame delay distance between sequential positions of a frame of the media stream to be received and a frame of the media stream being requested, the frame delay time representing a normal playing time for playing the number of delayed frames by the media receiving unit, the response message allowing the media receiving unit to perform a media quickening process on the media stream of the second media service according to the received message comprising the information for reducing the media delay; and the media receiving unit, configured to send the media switching request for switching from the first media service to the second media service to the media processing unit; receive the response message and the media stream of the second media service that are returned by the media processing unit; and perform the quickening process on the media stream of the second media service according to the information for reducing the media delay carried in the response message.

17. The system according to claim 16, wherein the information for the media receiving unit to reduce the media delay further comprises at least one of a frame rate, a sending rate or sending rate multiplier of a media stream, and a frame discard or frame jump interval.

18. The method according to claim 1, wherein the number of delayed frames represents a sum of the frame delay distance and an intrinsic media playing frame delay of the media receiving unit.

19. The method according to claim 1, wherein the frame delay time represents a sum of the normal playing time for playing the number of delayed frames by the media receiving unit of and an intrinsic media playing time delay of the media receiving unit.

20. The method according to claim 18, wherein the frame delay time represents a sum of the normal playing time for playing the number of delayed frames by the media receiving unit of and an intrinsic media playing time delay of the media receiving unit.

* * * * *